United States Patent Office 3,393,839
Patented July 23, 1968

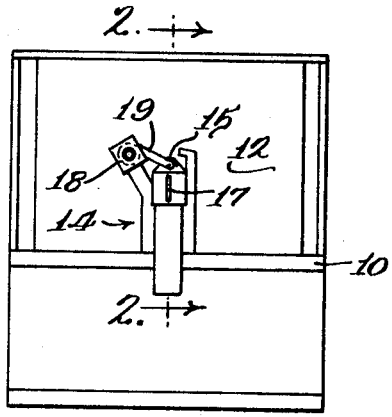
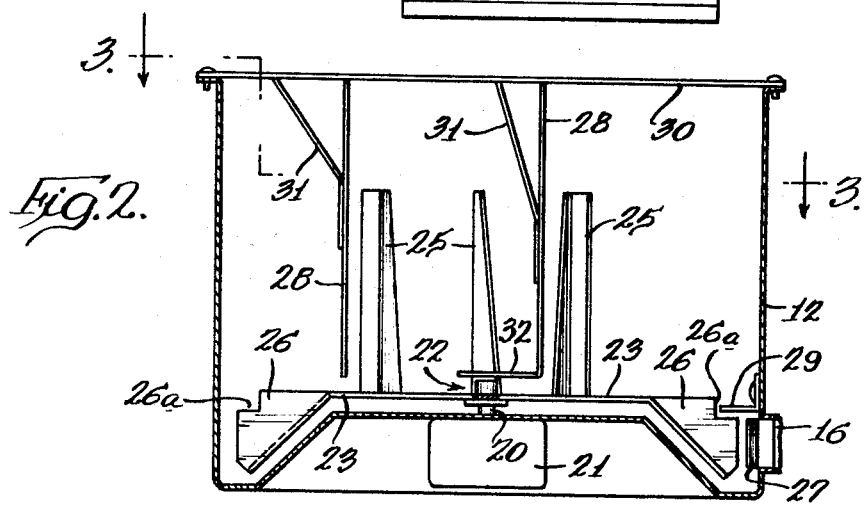
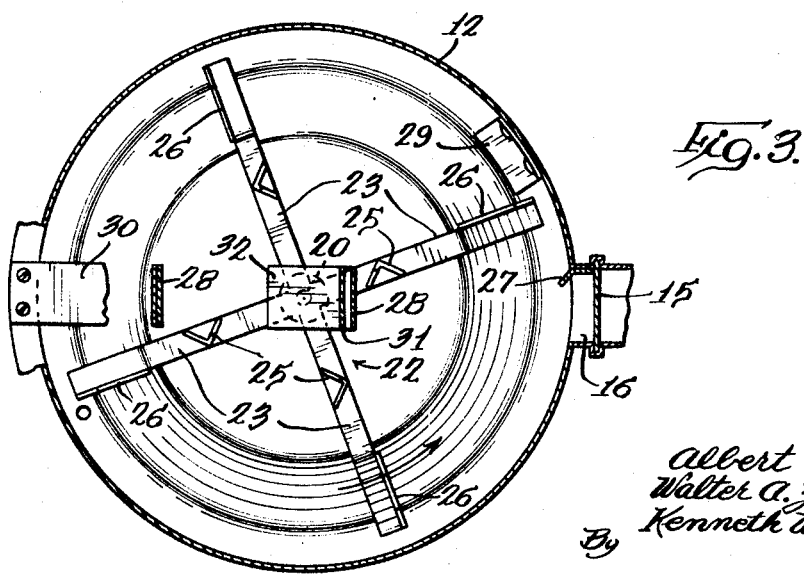

3,393,839
ICE DISPENSER
Albert G. Weil and Walter A. Zeuschner, Chicago, and Kenneth W. Zeuschner, Morton Grove, Ill., assignors to Remcor Products Company, Chicago, Ill., a corporation of Illinois
Filed May 23, 1966, Ser. No. 552,166
4 Claims. (Cl. 222—239)

ABSTRACT OF THE DISCLOSURE

An ice-dispensing hopper for effectively handling crushed, cracked and/or flake ice without agglomeration or congealing thereof, characterized by a rotary agitator having upstanding pushers for engagement in the ice and for rotating the ice in the hopper as a generally unitary mass, and knives extending into the hopper both parallel to and transversely of the axis of rotation of the mass so that they impart tremor-like movements to the ice in directions both parallel and radially of said axis and maintain the ice as a free-flowing mass of discrete particles. Additionally, the hopper is provided at its bottom with a circumferential trough with which a discharge opening communicates, and the agitator is equipped with paddles operating in this trough to effectively discharge the discrete particles of ice through the opening.

Background of the invention

When small particles of ice, such as the three types mentioned, are stored in bulk, they tend to congeal into a solid mass and it becomes difficult if not impossible to dispense the same automatically in an essentially free-flowing condition. Moreover, the ice, especially softer ices such as flake ice will agglomerate to such an extent that cavitation will take place within the interior of the mass leaving the dispensing area devoid of ice even though the storage hopper is full.

Efforts have been made heretofore to overcome these problems by incorporating agitators in the ice storage hopper and motivating the agitators continuously or at the time it is desired to dispense some ice, whereby to break up the ice into discrete particles, render the same free-flowing and maintain an adequate quantity of free-flowing ice particles in the dispensing area. See for example our earlier Patents 3,165,901, 3,211,338 and 3,217,509. However, the prior efforts have not afforded a complete solution to the problems, and agglomeration and cavitation have continued to be vexatious, especially with flake ice.

Object of the invention

The object of the present invention is the provision of an improved hopper and improved agitating means for discrete particles of ice overcoming the stated problems and assuring dispensing upon each demand of full measures of free-flowing discrete particles of ice.

Other objects and advantages of the invention will become apparent in the following detailed description.

The drawings

FIGURE 1 is a front elevation of an ice dispenser embodying our invention;

FIGURE 2 is a central vertical section of the hopper and ice dispensing means provided by this invention; and FIGURE 3 is a horizontal section taken substantially on line 3—3 of FIGURE 2.

Description of the invention

In order to acquaint those skilled in the art with the manner of making and using our improved ice-storing and dispensing means, we have illustrated in the accompanying drawings and will now describe a preferred embodiment presently contemplated by us as the best mode of carrying out our invention.

As shown in FIGURE 1, an ice dispenser is conventionally comprised of a supporting framework 10 adapted to be covered by decorative sheets or cabinet work, an insulated hopper or tank 12 for storing a large quantity of crushed, cracked or flake ice, such as 50 lbs., and means 14 for accommodating discharge of ice from the lower end portion of the hopper.

The means 14 may take the form of any of the dispensing means shown in our Patents 3,165,901, 3,211,338 and 3,217,509. However, we prefer and have illustrated herein dispensing means like that disclosed in our Patent 3,211,338 to which reference is made for a more detailed description. Briefly, such means comprises a vertically reciprocable gate 15 normally closing an ice discharge opening or hole 16 in the side wall of the hopper 12, a spring 17 normally biasing the gate to closed position, and a solenoid 18 coulped by a lever 19 to the gate for opening the same. The solenoid is under the control of a switch located at the discharge end of the means 14 which is adapted to be contacted by a glass or other receptacle to initiate operation of the solenoid and thus open the gate. It is preferable to provide electrical control switch and timer means in the circuit of the solenoid to accommodate (a) holding the gate open for continuous discharge of ice and (b) opening of the gate for a predetermined interval of time for discharge of a measured quantity of ice. The gate and the operating and control means therefor are described in detail in our said Patent 3,211,338.

The hopper 12 is essentially a tub having a cylindrical side wall and a centrally embossed circular bottom wall forming a peripheral annular ice receiving trough with which the discharge opening 16 communicates. Drain holes are provided in the bottom of the trough for removal of water resulting from melting ice, and the opening 16 is spaced above the bottom of the trough so that only discrete particles of relatively dry ice will be discharged The bottom wall of the hopper is centrally apertured for upward, liquid sealed passage therethrough of a shaft 20 coupled to a drive motor 21 which is suitably mounted on the framework 10 exteriorly of the hopper. The motor 21 may comprise an electric gear motor coupled in the circuit of the gate operating solenoid 18 for operation at least conjointly with operation of the solenoid. Preferably, the aforesaid timer means is connected to the solenoid and the motor in such fashion, known in the art, that the motor is operated for a short interval before as well as during energization of the solenoid.

Mounted on the shaft 20 within the interior of the hopper is an agitator 22 having a plurality of radial arms 23 which generally follow the contour of the bottom wall of the hopper and would normally serve to agitate the ice, break the same into discrete particles if the ice had congealed or agglomerated, and otherwise tend to maintain a supply of free-flowing discrete particles of ice adjacent the opening 16 and gate 15. However, especially with flake ice, an agitator comprised simply of the arms 23 has not satisfactorily attained the stated object due to agglomeration followed by cavitation of the mass of ice above the agitator arms.

According to the present invention, the arms 23 are first provided with upstanding projections or pushers 25 which serve to engage within the mass of ice placed in the hopper and to cause substantially the entirety of this mass to rotate with the agitator. These pushers are preferably rigid strips of metal bent to V cross-section for strength and welded or otherwise secured to the arms 23. The pushers may be secured to the arms at the same radial spacing if desired, or may be set in radially staggered relation in order to gain a better purchase on the mass of ice. Secondly, each arm 23 is provided at the outer end thereof with a paddle 26 substantially fitting the cross-sectional configuration of the annular trough portion of the hopper and assisting in the above-described function. In particular, the paddles 26 insure a constant movement of ice through the trough and past the opening 16, whereby to maintain the opening not only filled with ice, but actually to maintain a positive discharge pressure on the ice in this area by virtue of the movement forcing action of the paddles.

Co-operating with the paddles in attainment of the last stated function is a deflector 27 extending radially inward into the trough portion of the hopper and projecting in an upstream direction from the downstream edge of the opening 16. As illustrated, the radial clearance between the paddles and the hopper wall (and thus the radially inward extension of the deflector 27) is relatively slight, but nevertheless sufficient to accommodate some inward extension of the deflector. The clearance between the paddles and the deflector is small and the deflector thus serves as a scoop to direct the moving ice from the trough and the paddles into the opening 16.

In order to maintain the pressurized or forced discharge functions afforded by the paddles 26 and deflector 27, it is necessary to prevent cavitation of the rotating mass of ice and to maintain the trough essentially full of discrete particles of ice moving as a fluid mass past the opening 16. To perform these functions, we have provided stationary knives 28 which project into the rotating mass of ice above the trough and at least one stationary knife 29 projecting into or adjacent the trough for maintaining the ice therein in the form of individual discrete particles.

In the preferred structure, the knives 28 project downwardly into the hopper eccentrically thereof from a supporting cross-bar 30 which extends diametrically across the top of the hopper. The knives 28 may, of course, be supported in any other suitable manner, and the same are so spaced relative to one another and the pushers 25 as to engage spaced portions of the rotating mass of ice without interfering with the pushers whereby to break the ice and maintain the same in the form of discrete particles. In a 50 lb. capacity hopper, we have found two of the knives 28 to be entirely adequate, one located radially inwardly and the other located radially outwardly of the pushers. In larger diameter hoppers, more of the knives may be required, and it may be necessary to locate the same inwardly, outwardly and in between the circles of movement of the pushers 25. Similarly, more of the pushers may be required in the larger sizes.

Each of the knives 28 is suitably a simple strap of metal secured to and depending from the cross-bar in spaced, parallel, substantially co-extensive relation to the pushers 25. The knives terminate, of course, above the plane of rotation of the agitator arms 23 and may if necessary be braced, as indicated at 31, at locations outside the circles of movement of the pushers 25. The innermost one of the knives 28 preferably includes at its lower end a horizontal extension 32 overlying the shaft 20 for the purpose of preventing inadvertent disassociation of the agitator 22 from the shaft. By virtue of this constructional feature, the agitator may simply be slipped onto the shaft and retained thereon by the extension 32. Then the entire apparatus may conveniently be disassembled for cleaning simply by removing the cross-bar 30 and slipping the agitator off of its shaft.

The knives 28 in co-operation with the pushers 25 perform an unusual function relative to the rotating mass of ice in that the knives do not simply slash respective cuts into the mass, but cause significant lateral or transverse displacement of the ice as it passes the knives. To visual observation, the ice near the knives appear to undulate in and out as it passes the knives and this movement is in turn presumably transmitted through the mass causing an internal tremor or eruption and a consequent shifting of each discrete particle of ice relative to its neighbors, whereby to render the entire mass free flowing even though there are only two of the knives in the illustrated embodiment.

In a comparable manner, a knife 29 projecting horizontally into the trough area of the hopper creates a visual impression (even when the hopper is completely filled with ice) that the surface of the ice is snaking or undulating up and down at a location above each such knife. It appears therefore that the knife is not simply slashing a horizontal cut in the ice, but is imparting significant vertical movement to the ice passing adjacent the same, and this movement in turn is being transmitted through the mass like a tremor to render the whole a free flowing mass of discrete or individual particles. In a 50 lb. capacity hopper, we have found adequate a single knife 29 located on the inside surface of the hopper a short circumferential distance from the discharge opening 16 and so that it is reached by the pushers on the rotating agitator after they have passed the discharge opening. Additional knives may be provided if necessary. Also, the horizontal portion or extension 32 of the one knife 28 assists in producing vertical tremors much like the knife 29. In the preferred embodiment, the knife 29 is simply an L-shaped strap of metal secured to the side wall of the hopper and projecting into the trough or into the hopper at a location adjacent the trough at approximately the level of the discharge opening 16. To insure attainment of the described functions, we prefer to locate the knife 29 within the area swept by the paddles 26 and the paddles are suitably notched, as indicated at 26a, to provide clearance between the paddles and the knive or knives.

The knives 28 and 29 thus impart to the mass of ice vertically and horizontally directed tremors or shifting movements whereby to break up the mass into, or retain it in, the form of free flowing discrete particles. Even after a mass of ice has been allowed to sit in the hopper for a substantial period of time, say overnight or over a week-end, during which time thawing has caused the mass to become congealed, a few moments of rotation of the mass relative to the knives will result in the mass being returned to the form of free flowing discrete particles. Consequently, cavitation does not occur within the interior of the mass and the particles of ice flow freely downward to take the place of ice removed from the hopper via the discharge opening 16. The knife 29 especially serves to retain a full supply of free flowing discrete particles of ice in the trough of the hopper whereby the paddles 26 and deflector 27 may function properly to insure a free and full-flow discharge of ice each time the gate 15 is operated. This result is further assured by initiating operation of the agitator motor 21 for a short interval of time before the gate 15 is opened, whereby to insure the presence at the gate of free flowing ice even if the dispenser has not been operated for a long period of time.

It is thus seen that the present invention provides improved means for dispensing small pieces of ice, especially crushed, cracked and flake ice, in the form of free flowing discrete particles and does so in a convenient, economical and practical manner.

The manner in which the hopper is filled with ice is of little or no consequence to the present invention. The dispenser may be manually filled; it may be filled automatically from a primary reservoir; or it may be coupled with an icemaker as illustrated in our earlier patents. Irrespective of the source of the ice, the dispenser positively discharges the ice as free flowing discrete particles. Likewise, the specific form of the dispensing means 14 is not critical.

Thus, while we have shown and described what we regard to be the preferred embodiment of our invention, it is to be appreciated that various changes, rearrangements and modifications may be made therein without departing from the scope of the invention as defined by the appended claims.

We claim:

1. In an ice dispenser, a generally cylindrical hopper for reception of a mass of small particles of ice, an agitator rotatable in said hopper adjacent the lower end thereof, means for rotating said agitator within said hopper, upwardly extending pushers on said agitator for engaging the ice in the hopper and for rotating the ice as a generally unitary mass within the hopper, support means extending across said hopper above said agitator and said pushers, a plurality of knives depending from said support means parallel to but eccentrically of the axis of rotation of said agitator at different radial spacings from said axis from one another and said pushers, said knives including portions generally parallel to and substantially co-extensive with said pushers, and knives mounted on said hopper and projecting transversely into the mass of ice, said knives projecting both parallel to and transversely of the axis of rotation of the mass so that they impart tremor-like movements to the ice in directions both generally parallel to and radially of said axis to maintain the ice as a free flowing mass of discrete particles.

2. In an ice dispenser as set forth in claim 1, said hopper including a discharge opening adjacent its lower end, a deflector located on the inside surface of the hopper at the edge of said opening so that it is reached by the rotating of ice after the ice has passed said opening, and paddles on said agitator mounted for movement proximate said opening for forcing discrete particles of ice against said deflector and into said opening.

3. In an ice dispenser as set forth in claim 2, at least one of said knives projecting transversely into said hopper at approximately the level of said opening in circumferentially spaced relation to said opening.

4. In an ice dispenser as set forth in claim 2, said hopper including a peripherally located annular trough-like portion at its lower end communicating with said discharge opening, said deflector extending into said portion, said agitator including generally radially extending arms projecting into said portion, said paddles being generally complemental to said portion and mounted on said arms for movement proximate to said deflector for pushing ice through said portion against said deflector and into said opening, at least one of said knives projecting generally radially into said hopper at approximately the level of said opening and proximate to the path of movement of said paddles, and a plurality of said knives projecting generally parallel to said pushers eccentrically of the agitator and including portions extending substantially from the level of said paddles to above said pushers.

References Cited

UNITED STATES PATENTS

| 1,220,684 | 3/1917 | Ray | 222—242 X |
| 1,712,235 | 5/1929 | Small | 222—227 |
| 2,858,117 | 10/1958 | Girton | 259—108 X |
| 3,075,363 | 1/1963 | Conto | 222—239 X |
| 3,157,313 | 11/1964 | Sarmento et al. | 222—504 X |
| 3,192,734 | 7/1965 | Swanson | 62—344 X |
| 3,211,338 | 10/1965 | Weil et al. | 222—70 |
| 3,248,019 | 4/1966 | Kohler | 222—241 X |

FOREIGN PATENTS 627,955  8/1949  Great Britain.

ROBERT B. REEVES, *Primary Examiner.*